United States Patent Office 3,449,271
Patented June 10, 1969

3,449,271
LATEX PAINT COMPOSITIONS
Thomas L. O'Connor, Dedham, and Jean Paul Bourgault, Maynard, Mass., assignors to Cabot Corporation, Boston, Mass., a corporation of Delaware
No Drawing. Filed June 27, 1966, Ser. No. 560,801
Int. Cl. C09c 1/36, 3/02; C09d 5/02
U.S. Cl. 260—17                                                   5 Claims

ABSTRACT OF THE DISCLOSURE

A latex paint composition of improved stability comprising pigmentary pyrogenic titanium dioxide having a first coating of insoluble hydrous alumina and a second coating of insoluble hydrous silica. In addition the titanium dioxide pigment may have an insoluble hydrous titania coating deposited prior to the silica coating.

---

This invention relates generally to the production of titanium dioxide and more specifically to improved pyrogenic titanium dioxide pigments which possess superior stability in latex paint compositions.

The manufacture of pigment grade titanium dioxide by pyrogenic processes such as vapor phase oxidation or hydrolysis of titanium tetrachloride at elevated temperatures has grown significantly in recent years and has become commercially important. Frequently, the pyrogenic titanium dioxide produced lacks optimum properties. Consequently, various aftertreatment processes have been developed for improving substantially the properties of pyrogenic titanium dioxide so as to effect better dispersibility, chalking resistance, weather resistance, resistance to yellowing, etc. Generally, said aftertreatment processes deposit a coating of oxides or hydrates of alumina, titania or silica, alone or in various combinations onto the surface of the pyrogenic titanium dioxide.

However, one problem that has heretofore not been resolved by manufacturers of pyrogenic titanium dioxide relates to the fact that latex paint compositions comprising pigment grade titanium dioxide generally exhibit a substantial increase in viscosity on aging. Accordingly, although treatment of pyrogenic titanium dioxide with various additives to optimize certain properties has been widespread, the degree of stability of titanium dioxide-containing latex paint compositions heretofore produced frequently left much to be desired.

It is a principal object of the present invention to produce an improved pyrogenic titanium dioxide pigment.

It is another object of the present invention to produce latex paint compositions comprising pyrogenic titanium dioxide exhibiting improved stability.

Other objects and advantages of the present invention will in part be obvious and will in part appear hereinafter.

In accordance with the process of the present invention, a substantially stable latex paint can be produced by modifying the surface of the pyrogenic titanium dioxide pigment to be utilized therein with a coating of alumina and subsequently further coating the surface with silica. It should be noted that it is imperative that the silica be deposited onto the surface of the pigment *after* the alumina has been deposited thereon.

We believe, but do not wish to be bound by this explanation, that crystalline growth with time of alumina while deposited on the surface of titanium dioxide is substantial and that said crystal growth causes a substantial increase in the viscosity of the paint composition, thereby tending to form gels in said paint composition. However, when a titanium dioxide pigment coated with alumina is subsequently treated with silica, the silica coating suppresses significantly the crystal growth of the alumina. Accordingly, when a pigment so treated is utilized in latex paint, the resulting paint exhibits little or no change in viscosity on aging and therefore little or not tendency toward gelation.

In accordance with the present invention, the term, latex paint, refers generally to any emulsion paint composition comprising an emulsion of a binder in water, the binder being small globules or particles of natural or synthetic rubber or a plastic. Specific examples are styrene-butadiene rubber, polyvinyl acetate polymers and copolymers, polyacrylate polymers and copolymers and mixtures thereof.

The process by which the pyrogenic titanium dioxide starting material is produced is not critical. For instance, vapor phase hydrolysis or oxidation of volatile titanium halides such as titanium tetrachloride is entirely suitable. However, the pyrogenic titanium dioxide starting material utilized in accordance with this invention should have an average particle diameter of between about 150 and about 400 millimicrons. Preferably a pyrogenic titanium dioxide having an average particle diameter of between about 200 and 300 millimicrons is utilized.

Any soluble aluminum compound can be utilized to coat the titanium dioxide pigment in accordance with the present invention. However, solutions of said compounds when neutralized with a suitable material must form precipitates comprising insoluble hydrates or oxides. Examples of suitable aluminum compounds that can be utilized are aluminum sulfate, sodium aluminate, aluminum chloride, etc., and mixtures thereof. Preferred, however, in accordance with the present invention is aluminum sulfate.

The amount of aluminum hydrate or oxide precipitated onto the surface of the pyrogenic pigment is subject to considerable variation. In general, however, a coating of from about 0.5 to about 7.5% of alumina per weight of titanium dioxide is suitable for this invention.

Generally, any alkaline or acidic material can be utilized to neutralize the soluble aluminum compounds and form a precipitate in accordance with the present invention. When soluble acidic aluminum compounds are utilized, alkaline materials such as sodium carbonate, ammonium hydroxide, sodium bicarbonate, potassium carbonate, potassium bicarbonate, sodium hydroxide, potassium hydroxide or the like are suitable for accomplishing the neutralization. Most preferred, however, for purposes of the present invention are sodium carbonate or ammonium hydroxide. When, however, a soluble basic aluminum compound as mentioned hereinbefore is utilized, mineral acids such as hydrochloric and sulfuric acids can be utilized to neutralize said basic compounds and cause precipitation.

In general, any alkali, or ammonium silicate compound or mixture thereof can be utilized to coat the alumina-coated pyrogenic pigment. Especially preferred, however, in accordance with the present invention is a sodium silicate compound.

The amount of hydrous silica deposited on the surface of the pigment is subject to considerable variation. However, sufficient silica should generally be utilized to suppress substantially the crystal growth of the hydrate or oxide of alumina previously deposited on the pigment surface. In general, a coating of hydrous silica of between about 0.5 and 5.0% per weight of the titanium dioxide can be utilized in practicing the present invention.

It should be noted that it is well known and often extremely advantageous to add a silicate compound of the type defined above to a silica content on the titanium dioxide of between about 0.05 to 0.4% to a titanium dioxide slurry as a dispersing aid prior to any aftertreatment process. The use of silica in that way is unrelated, and can be complementary, to its use in accordance with the present invention wherein a silica coating is applied to an alumina-coated titanium dioxide.

A further embodiment of the present invention involves applying a coating to the titanium dioxide starting material of a hydrate or oxide of titania prior to, simultaneously with, or after the application of the coating of alumina. Any soluble titanium compound such as titanium tetrachloride, titanium sulfate, tetraethyl titanate and the like can be utilized for the purpose of applying the titania coating. However, titanium tetrachloride is preferred. It is pointed out, however, that it is imperative in accordance with the present invention that the silica coating be applied last irrespective of whether or not a titania coating is applied. Accordingly, when a titania coating is applied, the silica coating must follow.

The amount of hydrate or oxide of titania precipitated onto the titanium dioxide surface is not critical. In general, however, a coating of between about 0.5 and about 2.5% of titania per weight of the titanium dioxide starting material is entirely suitable. Moreover, the materials mentioned hereinbefore as being suitable to neutralize the solutions of aluminum compounds can be employed to neutralize the solutions of titanium compounds.

It should be further noted that the total percentage of all additives, i.e. titania, alumina and silica, deposited on the surface of the pyrogenic titanium dioxide starting material should generally not exceed 15% of the weight of pyrogenic titanium dioxide.

A better understanding of the present invention can be obtained from the following illustrative non-limiting examples.

Example 1

1000 grams of titanium dioxide which was produced by the vapor phase oxidation of titanium tetrachloride at temperatures above 800° C. and which has an average particle diameter of about 220 millimicrons, 500 milliliters of water and about 20 ml. of a $Na_2O$-3.22 $SiO_2$ solution (0.2 gram $SiO_2$/100 grams $TiO_2$) are briefly mixed and placed in a pebble mill for two hours. After removal of the aqueous solution from the pebble mill, 1750 milliliters of water, about 50 ml. of $TiCl_4$ (1.25 grams $TiO_2$/100 grams $TiO_2$), about 800 milliliters of $Al_2(SO_4)_3$ (5 grams $Al_2O_3$/100 grams $TiO_2$) and about 200 milliliters of $Na_2O$-3.22 $SiO_2$ (2.00 grams $SiO_2$/100 grams $TiO_2$) is mixed into the resulting aqueous slurry of titanium dioxide and the resulting slurry is heated to about 70° C. for 30 minutes. Next, about 1250 milliliters of a 13% solution of $Na_2CO_3$ is added to neutralize the resulting slurry to a pH of about 8.0 and coat the surface of the pyrogenic titanium dioxide with hydrous titania, alumina, and silica simultaneously. The solution of treated pigment is screened, dried and milled and utilized hereinafter in Examples 11 and 12.

Solutions of $TiCl_4$; $Al_2(SO_4)_3$; $Na_2O$-3.22 $SiO_2$; and $Na_2CO_3$ of the same strengths as utilized above are utilized in Examples 2–9 inclusive.

Example 2

This example is a duplicate of Example 1 with the exception that to the slurry removed from the pebble mill, there are added only 1750 milliliters of water and about 800 milliliters of the $Al_2(SO_4)_3$ solution (5 grams $Al_2O_3$/100 grams $TiO_2$). The resulting slurry is heated to 70° C. and then neutralized with $Na_2CO_3$ solution to a pH of about 7.0 thereby coating the titanium dioxide with hydrous alumina. Then, about 200 milliliters of $Na_2O$-3.22 $SiO_2$ solution (2.00 grams $SiO_2$/100 grams $TiO_2$) is mixed into the resulting slurry and the resulting slurry is maintained at 70° C. thereby coating the pigment with hydrous silica. Next, about 50 milliliters of $TiCl_4$ (1.25 grams $TiO_2$/100 grams $TiO_2$) is mixed into the resulting slurry and the resulting slurry is maintained at 70° for 30 minutes. Sufficient $Na_2CO_3$ solution is then introduced to neutralize the slurry to a pH of about 8.0 thereby coating the pigment with hydrous titania. This pigment is screened, dried and milled and utilized hereinafter in Examples 11 and 12.

Example 3

This example is a duplicate of Example 1 with the exception that to the slurry removed from the pebble mill, there are added 1750 milliliters of water and about 50 milliliters of the $TiCl_4$ solution (1.25 grams $TiO_2$/100 grams $TiO_2$). The resulting slurry is heated to 70° C. and then neutralized with $NaCO_3$ to a pH of about 7.0 thereby coating the titanium dioxide with hydrous titania. About 200 milliliters of $Na_2O$-3.22 $SiO_2$ solution (2.00 grams $SiO_2$/100 grams $TiO_2$) is then mixed into the resulting slurry maintained at 70° C. thereby coating the pigment with hydrous silica. Next, about 800 milliliters of $Al_2(SO_4)_3$ solution (5 grams $Al_2O_3$/100 grams $TiO_2$) is mixed into the resulting slurry and maintained for 30 minutes at 70° C. The slurry is then neutralized with $Na_2CO_3$ solution to a pH of about 8.0 thereby coating the pigment with hydrous alumina. This pigment is screened, dried and milled and utilized hereinafter in Examples 11 and 12.

Example 4

This example is a duplicate of Example 1 with the exception that to the slurry removed from the pebble mill, there are added 1750 milliliters of water and about 200 milliliters of $Na_2O$-3.22 $SiO_2$ solution (2.00 grams $SiO_2$/100 grams $TiO_2$). The resulting slurry is heated to 70° C. thereby coating the titanium dioxide with hydrous silica. Then, about 50 milliliters of $TiCl_4$ solution (1.25 grams $TiO_2$/100 grams $TiO_2$) and about 800 milliliters of $Al_2(SO_4)_3$ (5 grams $Al_2O_3$/100 grams $TiO_2$) solution are mixed into the resulting slurry which is maintained at 70° C. for 30 minutes. The slurry is then neutralized with $Na_2CO_3$ solution to a pH of about 8.0 thereby simultaneously coating the surface of the silica-coated titanium dioxide with hydrous titania and hydrous alumina. This pigment is screened, dried and milled and utilized hereinafter in Examples 11 and 12.

Example 5

This example is a duplicate of Example 1 with the exception that to the slurry removed from the pebble mill, there are added 1750 milliliters of water and about 200 milliliters of $Na_2O$-3.22 $SiO_2$ solution (2.00 grams $SiO_2$/100 grams $TiO_2$). The resulting slurry is heated to 70° C. coating the titanium dioxide with hydrous silica. Then, about 800 milliliters of $Al_2(SO_4)_3$ solution (5 grams $Al_2O_3$/100 grams $TiO_2$) is mixed into the slurry and the slurry is maintained at 70° C. The resulting slurry is then neutralized with $Na_2CO_3$ solution to a pH of about 7.0. Next, about 50 ml. of $TiCl_4$ solution (1.25 grams $TiO_2$/100 grams $TiO_2$) is mixed into the resulting slurry and the resulting slurry is maintained at 70° C. for 30 minutes. The resulting slurry is neutralized with $Na_2CO_3$ solution to a pH of about 8.0 thereby depositing a coating of hydrous titania. This pigment is screened, dried and milled and utilized hereinafter in Examples 11 and 12.

Example 6

This example is a duplicate of Example 1 with the exception that to the slurry removed from the pebble mill there are added 1750 milliliters of water and about 50 ml. of $TiCl_4$ solution (1.25 grams $TiO_2$/100 grams $TiO_2$). The resulting slurry is heated to 70° C. and neutralized with $Na_2CO_3$ solution to a pH of about 6.0 thereby coating the titanium dioxide with hydrous titania. Next, about 800 milliliters of $Al(SO_4)_3$ solution (5 grams $Al_2O_3$/100 grams $TiO_2$) is mixed into the resulting slurry and maintained at 70° C. and then the resulting slurry is neutralized with $Na_2CO_3$ solution to a pH of 7.0 thereby coating the titanium dioxide with hydrous alumina. Next, about 200 milliliters of $Na_2O$-3.22 $SiO_2$ solution (2.00 grams $SiO_2$/100 grams $TiO_2$) is mixed into the resulting slurry and maintained for 30 minutes at 70° C. thereby coating the titanium dioxide with hydrous silica. This modified pigment is screened, dried and milled and utilized hereinafter in Examples 11 and 12.

Example 7

This example is a duplicate of Example 1 with the exception that to the slurry removed from the pebble mill there are added 1750 milliliters of water and about 50 milliliters of $TiCl_4$ solution (1.25 grams $TiO_2$/100 grams $TiO_2$). The resulting slurry is heated to 70° C. Then about 800 milliliters of $Al_2(SO_4)_3$ solution (5 grams $Al_2O_3$/100 grams $TiO_2$) is mixed into the resulting slurry which is maintained at 70° C. and then neutralized to a pH of about 7.0 with $Na_2CO_3$ solution thereby coating the titanium dioxide with hydrous titania and hydrous alumina. Next, about 200 milliliters of $Na_2O$–$3.22$ $SiO_2$ (2.00 grams $SiO_2$/100 grams $TiO_2$) solution is mixed into the resulting slurry and maintained for 30 minutes at 70° C. thereby coating the titanium dioxide with hydrous silica. This modified pigment is screened, dried and milled and utilized hereinafter in Examples 11 and 12.

Example 8

This example is a duplicate of Example 1 with the exception that to the slurry removed from the pebble mill there are added 1750 milliliters of water and about 800 milliliters of $Al_2(SO_4)_3$ (5 grams $Al_2O_3$/100 grams $TiO_2$). The resulting slurry is heated to 70° C. and neutralized with $Na_2CO_3$ solution to a pH of about 6.0 thereby coating the titanium dioxide with hydrous alumina. Next, 50 ml. of $TiCl_4$ solution (1.25 grams $TiO_2$/100 grams $TiO_2$) is mixed into the resulting slurry which is maintained at 70° C. and then the resulting slurry is neutralized with $Na_2CO_3$ solution to a pH of 7.0 thereby coating the titanium dioxide with hydrous titania. Next, about 200 milliliters of $Na_2O$–$3.22$ $SiO_2$ solution (2.00 grams $SiO_2$/100 grams $TiO_2$) is mixed into the resulting slurry which is maintained at 70° C. for 30 minutes thereby coating the titanium dioxide with hydrous silica. This modified pigment is screened, dried and milled and hereinafter utilized in Examples 11 and 12.

Example 9

This example is a duplicate of Example 1 with the exception that to the slurry removed from the pebble mill there are added 1750 milliliters of water and 800 milliliters of $Al_2(SO_4)_3$ solution (5 grams $Al_2O_3$/100 grams $TiO_2$). The resulting slurry is heated to 70° C. and then neutralized with $Na_2CO_3$ solution to a pH of about 7.0 thereby coating the titanium dioxide with hydrous alumina. Next, about 200 milliliters of $Na_2O$–$3.22$ $SiO_2$ solution (2.00 grams $SiO_2$/100 grams $TiO_2$) is mixed into the resulting slurry and the slurry is then maintained at 70° C. thereby coating the alumina-coated titanium dioxide with hydrous silica. This pigment is screened, dried and milled and utilized hereinafter in Examples 11 and 12.

Example 10

This example is a duplicate of Example 9 with the exception that only about 50 milliliters (rather than 200 milliliters) of $Na_2O$–$3.22$ $SiO_2$ solution (0.50 grams $SiO_2$/100 grams $TiO_2$) is mixed into the slurry of alumina-coated titanium dioxide. This pigment is screend, dried and milled and utilized hereinafter in Examples 11 and 12.

Example 11

Each of the titanium dioxide pigments produced in Examples 1–10 is utilized to produce a latex paint comprising the following ingredients:

| | Grams |
|---|---|
| (1) Hydroxyethyl cellulose (2% solution in $H_2O$) | 105.0 |
| (2) Water | 86.2 |
| (3) Dispersant (sodium salt of a polymeric carboxylic acid) | 4.5 |
| (4) Ethoxylated alkyl phenol | 2.0 |
| (5) Polypropylene glycol | 1.5 |
| (6) Titanium dioxide | 125.0 |
| (7) Calcium carbonate | 42.0 |
| (8) Aluminum silicate pigment | 50.0 |
| (9) Diethylene glycol monoethyl ether | 9.0 |
| (10) Polyvinyl acetate latex | 145.0 |
| (11) Defoamer | 1.5 |
| (12) Ethylene glycol | 9.0 |
| (13) Phenylmercuric acetate | 0.5 |

Ten individual compositions are produced by mixing in each case in a one pint stainless steel beaker items 1–10 in the order listed, followed by grinding for 10 minutes in a Cowles Dissolver. Next, the balance of ingredients in the order in which they are listed, are mixed into 40.8 grams of the paste obtained from the Cowles Dissolver. Thus ten individual latex paint compositions are produced, each composition containing one of the titanium dioxide pigments produced in Examples 1–10.

Example 12

Each titanium dioxide pigment produced in Examples 1–10 is utilized to produce an oil base paint comprising the following ingredients:

| | Gms. |
|---|---|
| (1) Titanium dioxide | 200.0 |
| (2) Calcium carbonate | 429.8 |
| (3) Diatomaceous earth | 20.0 |
| (4) Soybean lecithins | 5.0 |
| (5) Alkyl resin | 386.5 |
| (6) Mineral spirits | 130.8 |
| (7) 24% Pb drier | 4.0 |
| (8) 6% Co drier | 2.0 |
| (9) Anti-skinning agent | 1.0 |

The first four ingredients and 350 grams of the alkyd resin are mixed on the Cowles Dissolver for 10 minutes. The balance of the alkyl is then added with the remainder of the ingredients and the composition is then thoroughly stirred. Thus, ten individual oil base compositions are produced each containing one of the titanium dioxide pigments produced in Examples 1–10.

Example 13

The latex paint compositions produced in Example 11 and the oil base paint compositions produced in Example 12 are placed in a circulating air oven set at 140° F. After 5 days at 140° F., the paint compositions are removed from the circulating oven and allowed to come to room temperature. Upon careful examination, each of the latex paint compositions produced in Example 11, it is found that those compositions produced in Examples 1, 2, 3, 4, 5 and 10 have gelled very badly and are therefore totally unsuitable as quality paint compositions. However, those paint compositions comprising titanium dioxide produced in Examples 6, 7, 8 and 9 have not gelled and are found to be entirely saleable as quality paint compositions.

The oil base paint compositions were also carefully examined. It was found that none of these compositions have gelled. Therefore, the manner and order in which hydrous oxides of alumina, titania, and silica are deposited upon the surface of titanium dioxide utilized in oil base paints do not significantly alter the stability of oil base paint compositions.

Example 14

Samples of the latex paint compositions produced in Example 11 and the oil based paint compositions produced in Example 12 are allowed to age for 30 days at room temperature (20° C.). After 30 days, each of the paint compositions is carefully examined. It is found that those latex paint compositions produced in Examples 1, 2, 3, 4, 5 and 10 have gelled very badly and are totally unacceptable as quality paint compositions. However, those latex paint compositions comprising titanium dioxide produced in Examples 6, 7, 8 and 9 have not gelled and are found to be entirely suitable as quality paint compositions.

It is also found that none of the oil base paint composition have gelled. Therefore it is clear that the manner and order in which hydrous oxides of alumina, titania and silica are precipitated upon the surface of titanium dioxide utilized in oil base paint compositions do not significantly alter the stability of oil base paint compositions whereas the manner and order in which said oxides are precipitated do seriously alter the stability of latex base compositions.

Obviously, many changes can be made in the above description and examples without departing from the scope of the present invention.

For instance, polyvinyl acetate polymer and copolymers and polyacrylate polymers and copolymers and the like can be utilized in combination with titanium dioxide pigments produced in accordance with the present invention to produce excellent paint compositions.

Also, hydrous oxides known in the art other than titania and in addition to the alumina and silica can be deposited on titanium dioxide in accordance with the present invention so long as alumina is deposited and silica is deposited last.

What is claimed is:

1. A stable latex paint composition comprising pigment at pyrogenic titanium dioxide having an average particle diameter between about 150 and about 400 millimicrons and which has been first coated with from about 0.5 to about 7.5% by weight of insoluble hydrous alumina by weight of the titanium dioxide and subsequently coated with from about 0.5 to about 5.0% by weight of insoluble hydrous silica by weight of the titanium dioxide.

2. The paint of claim 1 wherein in addition to the alumina which has been deposited, an amount of from about 0.5 to about 2.5% by weight of insoluble hydrous titania by weight of the titanium dioxide has also been deposited as a coating prior to the silica coating.

3. The paint of claim 1 wherein said alumina coating is obtained by the neutralization of an aluminum sulfate solution.

4. The paint of claim 1 wherein said silica coating is obtained by the use of a sodium silicate solution.

5. The paint of claim 2 wherein the titania coating is obtained by the neutralization of a titanium tetrachloride solution.

References Cited

UNITED STATES PATENTS

| | | | |
|---|---|---|---|
| 2,387,534 | 10/1945 | Seidel | 106—308 |
| 3,035,966 | 5/1962 | Siuta | 106—300 |
| 3,146,119 | 8/1964 | Ritter | 106—308 |
| 3,251,705 | 5/1966 | Rieck | 106—300 |
| 3,203,818 | 8/1965 | Rechmann | 106—300 |

FOREIGN PATENTS 287,150   10/1965   Australia.

TOBIAS E. LEVOW, *Primary Examiner.*

SAMUEL E. MOTT, *Assistant Examiner.*

U.S. Cl. X.R.

106—300, 308; 260—29.6

U.S. PATENT OFFICE

UNITED STATES PATENT OFFICE

CERTIFICATE OF CORRECTION

Patent No. 3,449,271          Dated June 10, 1969

Thomas L. O'Connor et al.

It is certified that error appears in the above-identified patent and that said Letters Patent are hereby corrected as shown below:

Column 2, line 4, "not" should be -- no --.
Column 4, line 70, "Al(SO$_4$)$_3$ should be -- Al$_2$(SO$_4$)$_3$ --.
Column 7, line 33, "pigment" should be -- pigmentary --;
Column 7, line 34, "at" should be deleted.

SIGNED AND
SEALED
MAR 10 1970

(SEAL)
Attest:

Edward M. Fletcher, Jr.
Attesting Officer

WILLIAM E. SCHUYLER, JR.
Commissioner of Patents